United States Patent [19]
Isobe et al.

[11] Patent Number: 5,716,036
[45] Date of Patent: Feb. 10, 1998

[54] MOUNTING STRUCTURE FOR MOUNTING A POLYGON MIRROR

[75] Inventors: Soichi Isobe; Kazunori Hashimoto; Tohru Maruyama, all of Kanagawa-ken, Japan

[73] Assignee: Ebara Corporation, Tokyo, Japan

[21] Appl. No.: 575,488

[22] Filed: Dec. 20, 1995

[30] Foreign Application Priority Data

Mar. 17, 1995 [JP] Japan .................. 7-086541

[51] Int. Cl.[6] ........................... A47F 1/14
[52] U.S. Cl. .................. 248/466; 359/216
[58] Field of Search ................... 248/466, 475.1, 248/476; 359/198, 216, 217

[56] References Cited

U.S. PATENT DOCUMENTS

| | | | |
|---|---|---|---|
| 4,820,005 | 4/1989 | Hshimoto et al. | 359/198 X |
| 4,984,881 | 1/1991 | Osada et al. | 359/198 |
| 5,373,391 | 12/1994 | Isobe et al. | 359/198 X |
| 5,555,124 | 9/1996 | Yoshitsugu et al. | 359/198 X |

FOREIGN PATENT DOCUMENTS

| | | |
|---|---|---|
| 58-50329 | 11/1983 | Japan . |
| 61-94811 | 6/1986 | Japan . |
| 63-84118 | 6/1988 | Japan . |
| 64-12126 | 1/1989 | Japan . |
| 2-103778 | 8/1990 | Japan . |
| 3-2887 | 1/1991 | Japan . |
| 5-16575 | 4/1993 | Japan . |

*Primary Examiner*—Ramon O. Ramirez
*Attorney, Agent, or Firm*—Wenderoth, Lind & Ponack

[57] ABSTRACT

A mounting structure for mounting a polygon mirror on a rotating body includes a mirror seat formed in the rotating body for mounting the polygon mirror thereon and a fixing device for fixing the polygon mirror on the mirror seat. The mirror seat is formed on the periphery of the rotating body, and the polygon mirror includes in a top surface thereof an annular groove of a rectangular section at a position thereof a predetermined radius from the center of rotation of the rotating body. The fixing device comprises a planar ring-shaped anchoring member fixed to the rotating body and having along a peripheral portion thereof a plurality of downwardly extending conical or semispherical projections. The projections of the anchoring member engage with the annular groove in the polygon mirror and press against the upper edge of the inner periphery of the groove by point contact to thereby fix the polygon mirror in position. Thus, the polygon mirror is not thrown out of the balance over time and no pressing force is transmitted to the mirror surfaces.

19 Claims, 6 Drawing Sheets

MOUNTING STRUCTURE FOR MOUNTING A POLYGON MIRROR

BACKGROUND OF THE INVENTION

1. Field of the Art

The present invention relates to a structure for mounting a polygon mirror on a rotatable body of a polygon mirror scanner motor.

2. Prior Art

Conventionally, various structures have been employed for mounting a polygon mirror on a rotatable body of a polygon mirror scanner motor. FIG. 7 is a cross-sectional view showing a conventional mounting structure for a polygon mirror. In FIG. 7, reference numeral 51 denotes a cylindrical ceramic ring. A sleeve 52 is shrink-fitted onto the ceramic ring 51, and then the surfaces of the sleeve 52 and a sleeve 55 which contact a polygon mirror 53 are finished to a very high flatness and surface roughness. Then, the polygon mirror 53 is held between the sleeve 52 and the sleeve 55 and fixed by tightening a plurality of screws 66. The reference numeral 56 is rotor magnet of a motor and is fixed to the sleeve 55 at the bottom surface thereof. The polygon mirror 53 has a polygonal plane, and mirror surfaces 54 corresponding to a polygonal number are formed on the periphery thereof.

FIG. 8 is a cross-sectional view showing a conventional polygon mirror scanner motor with the aforesaid mounting structure incorporated thereinto. As illustrated, in the polygon mirror scanner motor, a radial axle 59 made of ceramic is fixed on a spindle 58 which is fixed on a mounting base 57, and a thrust plate 61 made of ceramic is fixed to the radial axle 59 at the bottom end surface thereof. The inner periphery of the ceramic ring 51 of the rotating body slidably contacts the outer periphery of the radial axle 59, and the bottom end surface of the ceramic ring 51 slidably contacts the thrust plate 61. Also, a thrust plate 60 made of ceramic and fixed to the bottom surface of a support plate 67 is fixed to the top end surface of the radial axle 59 by means of a bolt 62 threaded into the spindle 58. Furthermore, the outer periphery of the radial axle 59 and the inner periphery of the ceramic ring 51 form a radial dynamic-pressure bearing, and the top and bottom surfaces of the ceramic ring 51 and the opposite surfaces of the thrust plates 60, 61 form thrust dynamic-pressure bearings. To this end, spiral or herring bone grooves for producing dynamic pressure are formed on at least one of bearing surfaces of each of the radial and thrust dynamic-pressure bearings.

The aforesaid support plate 67 is fixed to the spindle 58 at the top end thereof with the bolt 62. Also, a counter magnet 63 is fixed to the bottom surface of the support plate 67 in a predetermined position and exerts a predetermined value of lifting force on the sleeve 52 formed of a magnetic material by means of a magnetic attraction force. By supplying a driving current (alternating current) to a stator coil 64, the aforesaid rotatable body including the polygon mirror 53 is caused to rotate at high speed.

FIGS. 9 and 10 are views showing other examples of a conventional mounting structure for a polygon mirror. In an example shown in FIG. 9, a polygon mirror 71 is held between an annular elastic member 72 formed of a plate spring and a seat member 73, and the polygon mirror 71 is directly pressed against the seat member 73 by an elastic force of the annular elastic member 72 to be fixed therebetween.

In an example shown in FIG. 10, the polygon mirror 71 is held between an elastic member 75 and a seat member 76, the elastic member 75 being formed of a rubber ring and held at its top surface by a presser member 74. The polygon mirror 71 is pressed against the seat member 76 by an elastic force of the elastic member 75 to be fixed therebetween.

However, in the mounting structure for a polygon mirror shown in FIG. 7, holes 53a are formed in the polygon mirror 53 to allow the bolts 66 to be inserted therethrough. As a result, the rigidity of the mirror itself is weakened, and deformation of the mirror becomes not negligible due to a centrifugal force and a thermal stress caused by high-speed rotation at high temperatures. This deformation not only causes the mirror surface to be distorted but causes the rotating body to be thrown out of balance. Also, since the mirror is held in position by a surface-frictional force generated by bolting, the mirror could shift out of center in the radial direction over time, causing the rotating body to be thrown out of balance. Furthermore, since the mirror is rigidly fixed with bolts, when deformation caused by a centrifugal force and a thermal stress occurs repeatedly, restoration of the deformation cannot be effected. Hence, it is conceivable that, over time imbalance of the rotating body and distortion of mirror surfaces of the polygon mirror may cause a deterioration in optical performance such as jittering and the like.

In an example shown in FIG. 9, the polygon mirror 71 is pressed from the upward and downward directions. However, in order to prevent the polygon mirror from deviating in the radial direction, i.e. to prevent deviation from the center of rotation, reliance must be made to a surface frictional force imparted by the annular elastic member 72 formed from a plate spring. Accordingly, in this mounting structure also, the rotating body may be thrown out of balance over time due to a centrifugal force and a thermal stress caused by a high speed rotation at high temperatures. Also, the radially outer edge of the elastic member 72 is positioned close to the mirror surfaces of the polygon mirror and presses the polygon mirror along the entire periphery thereof in a radially outward direction. As a result, the mirror surfaces become distorted, leading to a drawback that such distortion causes a deterioration in optical performance such as jittering and the like.

Likewise, in an example shown in FIG. 10, the polygon mirror 71 is fixed under an elastic surface-frictional force imparted by the elastic member 75 formed of a rubber ring. Thus, it is again conceivable that the rotating body will be thrown out of balance over time. Also, since the rubber ring presses the mirror along its entire periphery, distortion of the mirror surfaces is caused, leading to a deterioration in optical performance such as jittering and the like.

The present invention was made to eliminate the abovementioned drawbacks of the prior art arrangements. An object of the present invention is, therefore, to provide a mounting structure for a polygon mirror which does not cause a deterioration in the balance of the rotating body over time and which is easy to machine and excellent in stability.

SUMMARY OF THE INVENTION

In order to accomplish the objective described above, according to a first aspect of the invention, a mounting structure for mounting a polygon mirror on a rotatable body comprises a mirror seat formed in the rotatable body for mounting the polygon mirror thereon and a fixing means for fixing the polygon mirror on the mirror seat. The mirror seat is formed on the periphery of the rotatable body. The polygon mirror includes in a top surface thereof an annular groove of a rectangular section at a position thereof a predetermined radius from the center of rotation of the rotatable body. The fixing means comprises a planar ring-shaped anchoring member fixed to the rotatable body and having along a peripheral portion thereof a plurality of downwardly extending conical or semispherical projections, wherein the projections of the anchoring member engage with the annular groove in the polygon mirror and press against the upper edge of the inner periphery of the groove by point contact to thereby fix the polygon mirror in position.

According to the first aspect of the present invention, projections of the anchoring member engage with the annular groove formed in the polygon mirror, whereby the polygon mirror is pressed in a point contact manner at the upper edge of the inner periphery of the annular groove by the projections of the anchoring member. By this, an obliquely downward force acts on the polygon mirror, and the polygon mirror is pressed concurrently in the radially inward and downward directions by component forces of the pressing force. In this case, pressing of the mirror is effected in a radially inward direction through point contact and, therefore, no force acts on the mirror surfaces of the polygon mirror which are positioned on the outer periphery of the polygon mirror, whereby no distortion occurs in the mirror surfaces. In addition, since the polygon mirror is held in position by direct engagement between the projections of the anchoring member and the annular groove of the polygon mirror, the mirror does not go out of balance over time.

According to a second aspect of the invention, the anchoring member has a plurality of radially extending pawls along a peripheral portion thereof, and the projections extends downwardly from the pawls. By this arrangement, it will be easy to provide elasticity to the anchoring member and press against the groove edge with an elastic force.

The rotatable body preferably includes a ceramic ring and a cylindrical sleeve shrink fitted on the ceramic ring, the cylindrical sleeve includes a small-diameter portion and a large-diameter portion along the outer periphery thereof, and the mirror seat is formed on a shoulder portion between the small-diameter portion and the large-diameter portion. In such a case, if the height of the cylindrical sleeve is made substantially identical with that of the ceramic ring, a residual stress produced by shrink fitting becomes uniform over the entire outer periphery of the ceramic ring.

The projections may point contact both the upper edge of the inner periphery and the upper edge of the outer periphery of the annular groove. By this arrangement, the mirror is more positively held in position, but since the projections lightly press the upper edge of the outer periphery of the groove, no distortion is caused to the mirror surfaces.

According to a further aspect of the invention, an adhesive material is applied to the inside of the annular groove to correct the balance of the rotating body. By this arrangement, more precise balance of the rotating body can be obtained and such adjustment of the precise balancing can be effected even after a long period of operation.

According to a still further aspect of the invention, the anchoring member is formed of an elastic material. By this arrangement, since the mirror is not rigidly fixed, even when deformation is caused to the mirror by application of a centrifugal force or thermal stress, such deformation can be easily restored and, therefore, no deterioration in optical performance occurs.

According to a further aspect of the invention, the anchoring member comprises a first planar ring having along a peripheral portion thereof a plurality of the pawls, each provided with the projection, and a second planar ring formed of an elastic material and placed on top of the first planar ring. By this arrangement, even when a plate thickness of the anchoring member must be increased to provide a greater pressing force to the edge of the mirror groove, the tips of the conical or semispherical projections can be made sharp or small, because the thickness of the first planar ring having such projections can be made small and a pressing force can be added by the second planar ring. Therefore, it is possible to make the size of the groove small, which enables a decrease in deformation of the mirror.

Incidentally, the projections may be integrally formed with the pawls or formed independently of an elastic material and be fixed to the pawls.

When the projection is integrally formed with the pawl, for example, by pressing, the machining and construction of the anchoring member are simple. On the other hand, when the projection is made of an elastic material and is fixed to the pawl, elasticity of the anchoring member is provided by the projection itself and it is thus easy to select an appropriate shape and size of the projection.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 2(a) and 2(b) are views showing the detailed structure of an anchoring member of FIG. 1, wherein FIG. 2(a) is a plan view, and FIG. 2(b) is a cross-sectional view;

FIGS. 6(a) and 6(b) are views showing a mounting structure for a polygon mirror according to a further embodiment of the present invention, wherein FIG. 6(a) is a half cross-sectional view of the mounting structure, and FIG. 6(b) is a plan view of an anchoring member;

PREFERRED EMBODIMENTS OF THE INVENTION

A mounting structure for a polygon mirror according to embodiments of the present invention will now be described with reference to the drawings.

Figure 1:
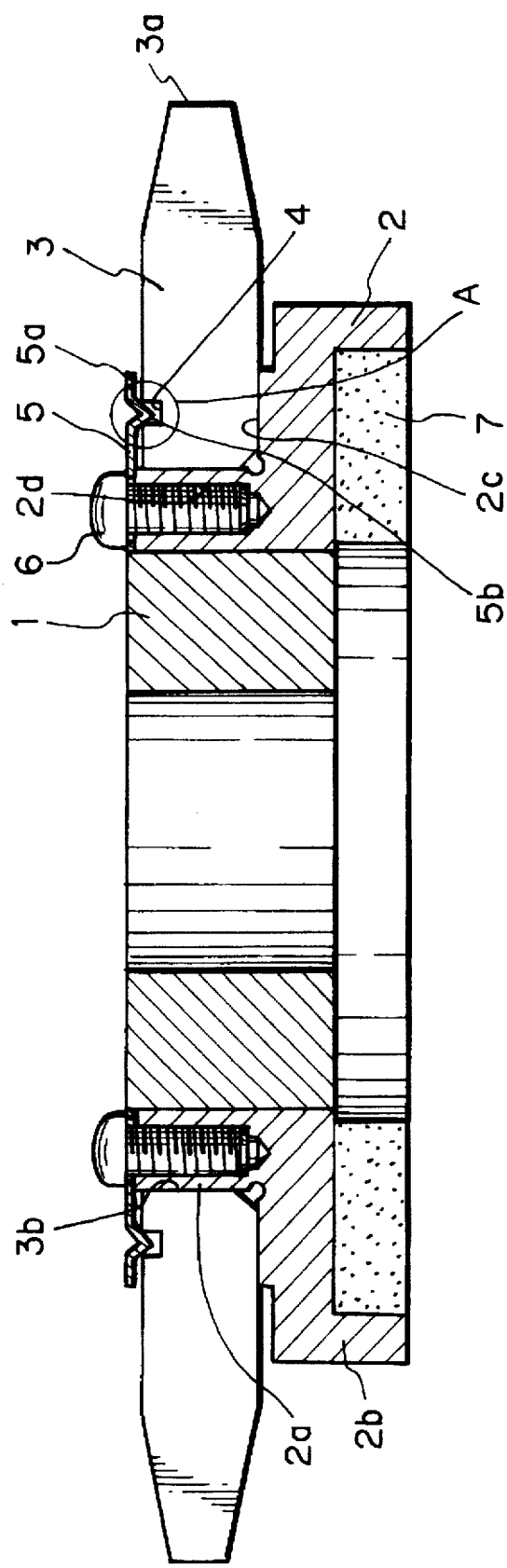
FIG. 1 is cross-sectional view of a mounting structure for a polygon mirror according to an embodiment of the present invention.

FIG. 1 is a cross-sectional view of a mounting structure for a polygon mirror according to an embodiment of the present invention. In FIG. 1, reference numeral 1 denotes a cylindrical ring formed of a ceramic material, the inner periphery thereof serving as the sliding surface of a radial dynamic-pressure bearing, both end surfaces thereof serving as sliding surfaces of a thrust dynamic-pressure bearing. To this end, spiral or herring bone grooves for producing dynamic-pressure are provided in at least one of the bearing surfaces a each of the radial and thrust dynamic-pressure bearings as in the conventional mounting structure. A sleeve 2 is shrink-fitted to the outer periphery of the ceramic ring 1. The sleeve 2 is substantially identical in height with the ceramic ring 1, and thus it is shrink-fitted to the ceramic ring 1 over the entire outer periphery thereof. As a result, a residual stress produced by shrink-fitting becomes uniform over the entire outer periphery of the ceramic ring 1.

As shown, the sleeve 2 is a cylindrical sleeve of an L-shaped section including a small-diameter portion 2a and a large-diameter portion 2b along the outer periphery thereof. A ring-shaped mirror seat 2c for supporting the bottom surface of the polygon mirror 3 is formed on a shoulder portion provided between the small-diameter portion 2a and the large-diameter portion 2b. In the polygon mirror 3, mirror surfaces 3a corresponding to a polygon number are formed on the periphery thereof, and a through-hole 3b is formed in the center portion thereof to allow the small-diameter portion 2a of the sleeve 2 to be fitted thereinto. An annular groove 4 of a rectangular section is formed in the top surface of the polygon mirror 3 in a position at a predetermined radius from the center of rotation.

Also, an anchoring member 5 is fixed to the sleeve 2 by means of screws 6 so that it is located above the polygon mirror 3. A rotor magnet 7 of a motor is fixed to the bottom surface of the sleeve 2.

Figure 2A:
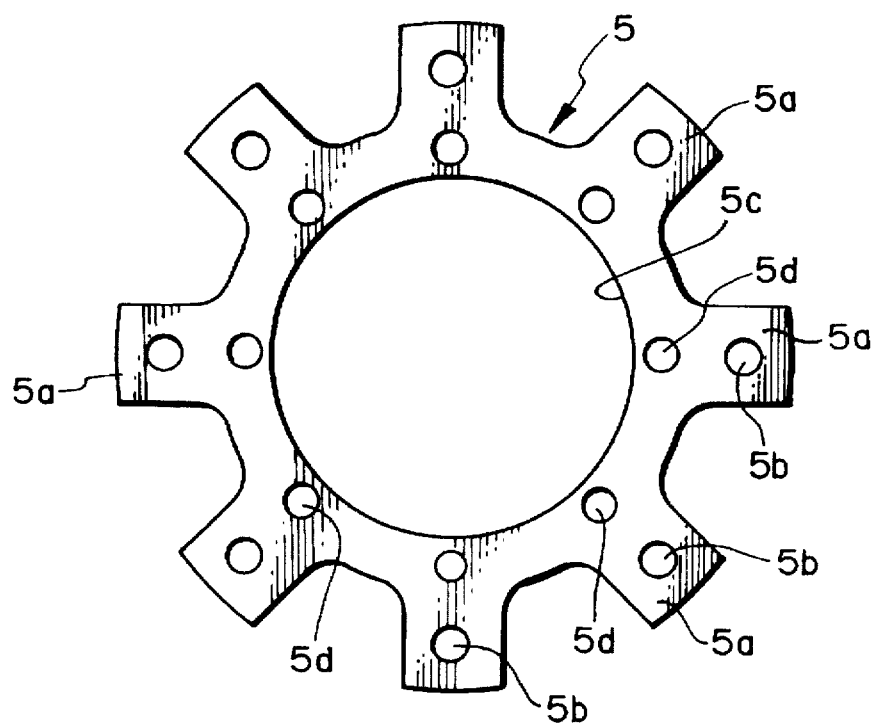
Figure 2B:
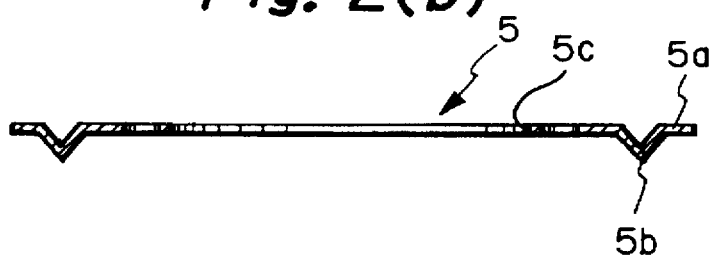

FIGS. 2(a) and 2(b) are views showing the structure of the anchoring member 5. FIG. 2(a) is a plan view, and FIG. 2(b) is a cross-sectional view. As shown in FIGS. 2(a) and 2(b), the anchoring member 5 is a planar ring-shaped member and formed of an elastic metal plate (e.g. hardened SK5) in which a through-hole 5c is formed at the center to allow the ceramic ring 1 to be inserted thereinto. Also, a plurality of tabs or pawls 5a project from the peripheral portion of the anchoring member 5 and are uniformly spaced from each other in a circumferential direction. Furthermore, a conical projection 5b is integrally formed from the bottom surface of each pawl 5a. Reference numeral 5d denotes an insertion hole for inserting the screw 6 therethrough.

The method of mounting the polygon mirror 3 to a rotating member will now be described briefly.

Figure 3:
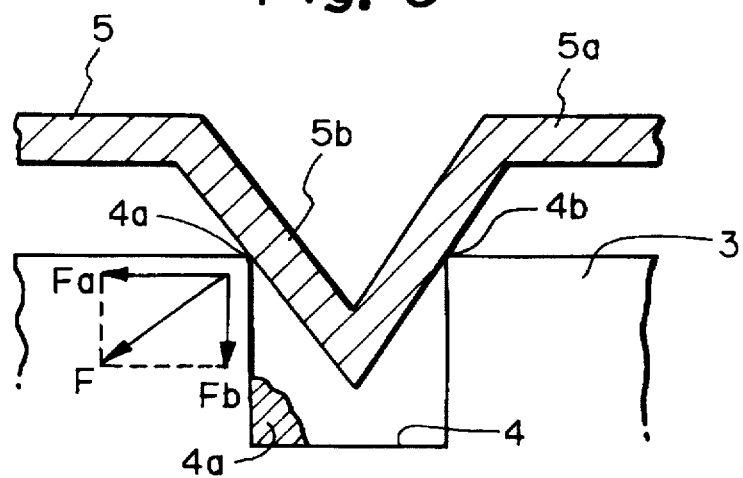
FIG. 3 is an enlarged cross-sectional view of portion A of FIG. 1 illustrating operation of the anchoring member and an annular groove.

First, the small-diameter portion 2a of the sleeve 2 shrink-fitted to the outer periphery of the ceramic ring 1 is inserted into the through-hole 3b in the polygon mirror 3. Then, the polygon mirror 3 is mounted on the mirror seat 2c. The mirror seat 2c is finished to a very high accuracy and roughness in advance. The anchoring member 5 is then mounted on the polygon mirror 3, and is fastened with screws 6 by threading them into a plurality of tapped holes 2d provided in the top surface of the sleeve 2. Thus, the projections 5b provided on the bottom surface of a plurality of pawls 5a provided along the periphery of the anchoring member 5 are engaged with the annular groove 4 in the polygon mirror 3. By engaging the projections 5b of the anchoring member 5 with the annular groove 4 in the polygon mirror 3, the polygon mirror 3 is pressed in a point contact manner at an upper edge 4a of the inner periphery of the annular groove 4 by the projections 5b of the anchoring member 5, as shown in FIG. 3, which is an enlarged view of portion A of FIG. 1. At this time, an obliquely downward force F acts on the polygon mirror 3, and thus the polygon mirror 3 is pressed concurrently in the radially inward and downward directions by component forces Fa and Fb of the force F. In this case, a pressing point is of a point contact and the force acts in a radially inward direction, and hence no force acts on mirror surfaces 3a of the polygon mirror, whereby no distortion occurs. Also, the projections 5b lightly point-contact an upper edge 4b of the outer periphery of the annular groove 4. However, the pressing force acting on the upper edge 4b of the outer periphery is relatively small, it does not cause any distortion in the mirror surfaces. Here, the ceramic ring 1 and the sleeve 2 compose a rotating body to fix the polygon mirror 3.

In FIGS. 1 and 2, a machining accuracy of 1/100 mm level is possible for the inner and outer peripheries of the annular groove 4 in the polygon mirror 3. Furthermore, the projection 5b formed in the pawl 5a of the anchoring member 5 makes point-contact at the upper edges 4a, 4b of the inner and outer peripheries of annular groove 4, as shown in FIG. 3. Thus, fixing is possible such that the projection 5b presses the upper edge 4a of the inner periphery and lightly contacts the upper edge 4b of the outer periphery. Also, as shown in FIGS. 1 and 3, the bottom surface of the annular groove 4 in the polygon mirror 3 is deeper than the height of the tip of the conical projection 5b, and thus the projection 5b of the anchoring member 5 can contact the annular groove 4 at the upper edges 4a, 4b of the inner and outer peripheries thereof. If desired, however, the size and/or the shape of the projection 5b and/or annular groove 4 may be so selected that the projection point-contacts only the upper edge 4a of the inner periphery of the groove. In view of the fact that a restorative property against a centrifugal force and thermal stress should preferably be provided to the anchoring member 5, and the fact that the projections 5b of the anchoring member 5 must properly contact the annular groove 4 in conformity with the shape thereof, the anchoring member 5 is preferably formed as an elastic member such as a plate spring or the like.

According to the present invention, the balance of the rotating body can be corrected by applying balance corrective adhesive 4a to the inside of the annular groove 4 in the polygon mirror 3 in positions other than those corresponding to the pawls 5a of the anchoring member 5.

Figure 4:
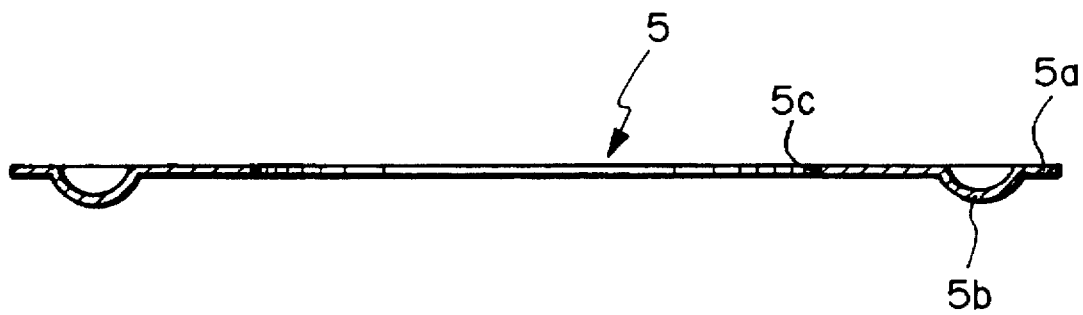
FIG. 4 is a cross-sectional view showing another embodiment of an anchoring member in the mounting structure for a polygon mirror according to the present invention.

FIG. 4 is a view showing an embodiment indicative of a modified example of the anchoring member 5 according to the present invention. In the present embodiment, the projection 5b formed on the bottom surface of the pawl 5a of the anchoring member 5 is in a semispherical shape. The remaining construction is similar to that of the anchoring member shown in FIGS. 2(a) and 2(b). Operation of the anchoring member 5 according to the present embodiment is similar to that illustrated in FIG. 3.

Figure 5:
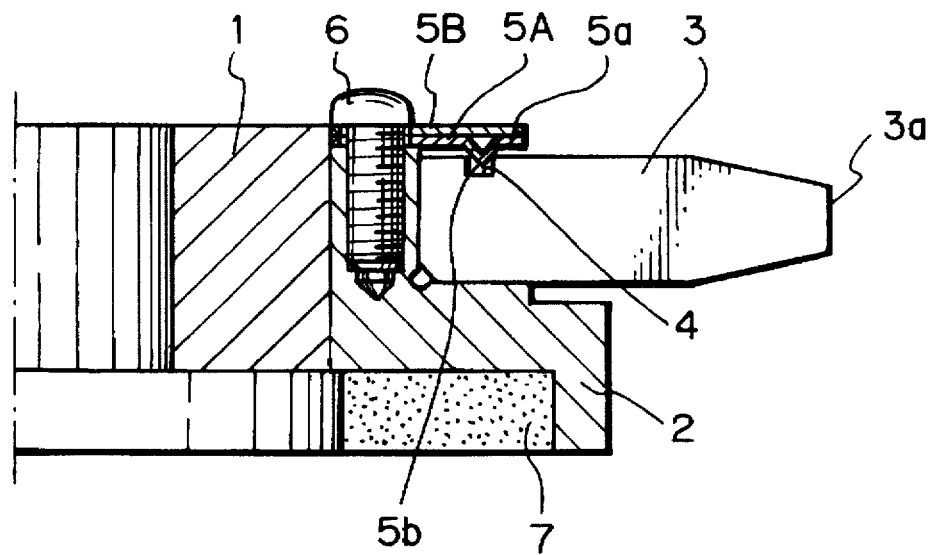
FIG. 5 is a half cross-sectional view showing a mounting structure for a polygon mirror according to another embodiment of the present invention.

FIG. 5 is a view showing another embodiment of the present invention. In FIG. 5, an anchoring member is formed by a first planar ring 5A and a second planar ring 5B overlapping or placed on top of the first planar ring 5A. The first planar ring 5A has a plurality of pawls 5a, each provided with the projection 5b, and the second planar ring 5B is formed of an elastic member such as a plate spring. In a plate spring, the thickness and pressing force F are proportional to each other. Thus, in order to obtain an appropriate or greater pressing force, the plate thickness must be increased. However, as the plate thickness increases, due to a process of forming projections in a plate spring, the tip of a conical projection becomes blunter, or the tip of a semispherical projection becomes larger.

On the other hand, in view of the machining and deformation of the mirror, it is desirable for the groove 4 cut in the mirror to be as shallow or small as possible. Accordingly, it is desirable that a projection to be engaged with the groove is as sharp and small as possible.

For the reason described above, the anchoring member 5 may be formed by the first planar ring 5A which is thin to provide sharp and small projections and the second planar ring 5B of the elastic member which provides an elastic force to the first planar ring 5A and the second planar ring 5B is placed on top of the first planar ring 5A.

Figure 6A:
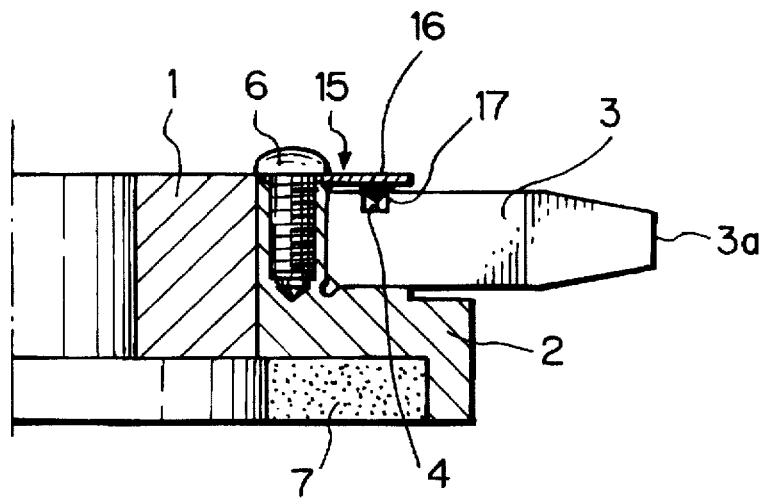
Figure 6B:
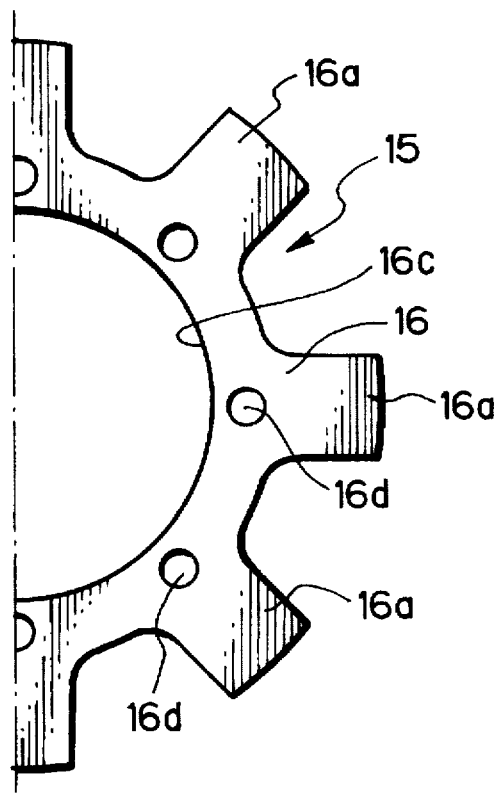
Figure 7:
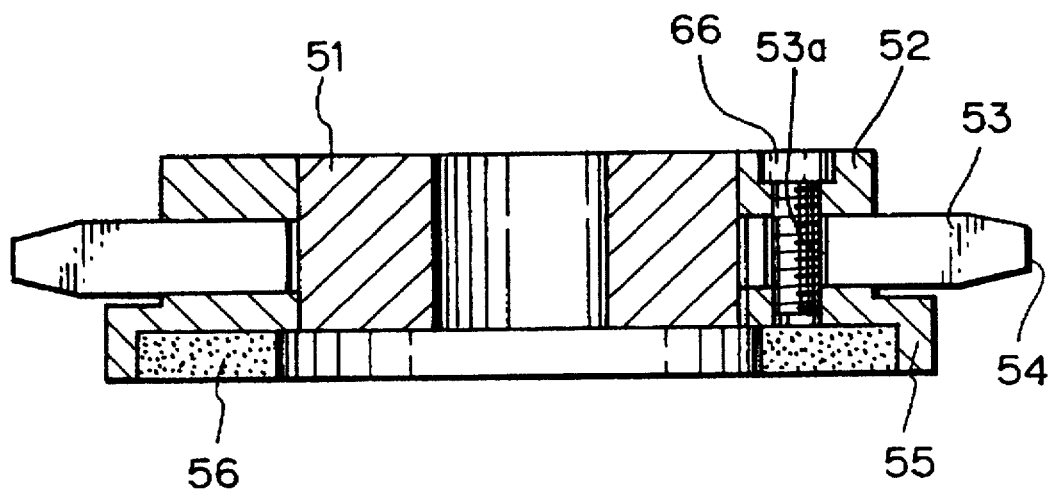
FIG. 7 is a cross-sectional view showing a conventional mounting structure for a polygon mirror.
Figure 8:
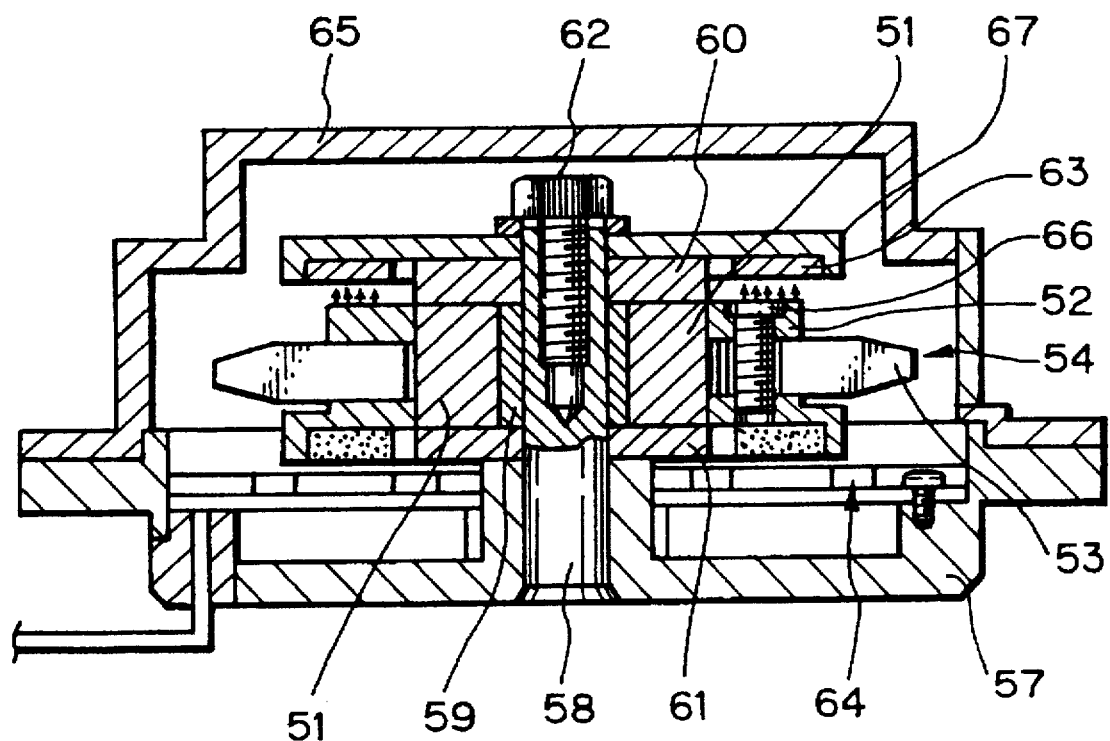
FIG. 8 is a cross-sectional view of a conventional polygon mirror scanner motor.
Figure 9:
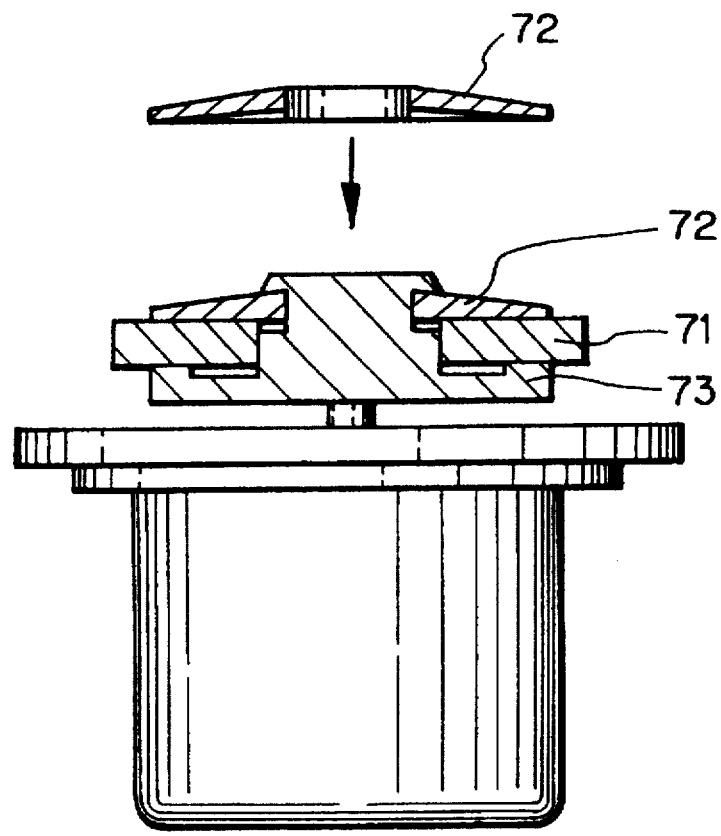
FIG. 9 is a cross-sectional view showing an another conventional mounting structure for a polygon mirror.
Figure 10:
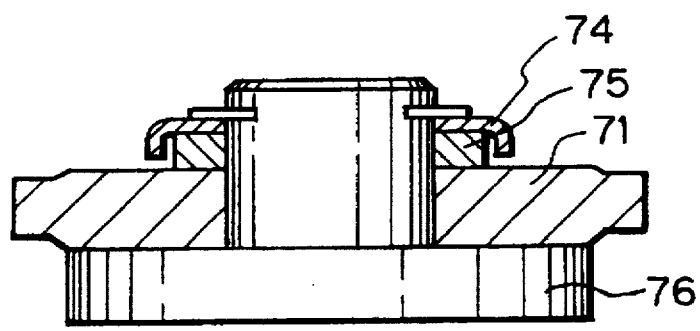
FIG. 10 is a cross-sectional view showing a still further conventional mounting structure for a polygon mirror.

FIGS. 6(a) and 6(b) are views showing a further embodiment of the present invention. FIG. 6(a) is a cross-sectional view of this embodiment, and FIG. 6(b) is a plan view of an anchoring member. In the embodiment shown in FIGS. 6(a) and 6(b), the anchoring member 15 is formed by a planar ring-shaped flat plate 16 and projections 17 attached thereto. The flat plate is formed of an elastic metal plate in which a through-hole 16c is formed at the center to allow the ceramic ring 1 to be inserted thereinto and has a plurality of pawls 16a at the peripheral portion thereof. The projection 17 is made of a conical or semispherical, elastic material like rubber, resin or the like and is fixed to the bottom surface of the pawl 16a. Thus the projections are separately manufactured thus providing an advantage that a dimensional accuracy of a projection itself can be more easily attained and that the shape of a projection can be formed more freely, as compared with the anchoring members shown in FIGS. 2 and 4 in which the projections are integrally formed in a plate spring by a press. Furthermore, reference numeral 16d denotes an insertion hole for inserting the screw 6 therethrough. The structure of the annular groove 4 in the polygon mirror 3 is similar to that of the embodiment shown in FIGS. 1 and 2. Operation of the anchoring member 15 is similar to that illustrated in FIG. 3.

As has been stated above, the present invention can provide the following advantageous effects.

(1) A polygon mirror is directly engaged and fixed in position by an anchoring member, not by surface frictional force, and a pressing force acts both in the downward direction and in the radially inward direction of the mirror. Thus, a rotating body is not thrown out of balance over time.

(2) Through-holes are not provided in a polygon mirror itself for inserting bolts therethrough. Thus, the rigidity of the mirror itself increases, whereby deformation of mirror surfaces is reduced, leading to improvements in optical performance.

(3) A polygon mirror may be fixed by an elastic anchoring member. Accordingly, the mirror may be fixed in a restorable manner against deformation caused by a centrifugal force and thermal stress under high-speed rotation at high temperatures. Hence, a rotating body is free from becoming out-of-balance over time, and deterioration in optical performance such as jittering and the like is prevented.

(4) A polygon mirror is fixed by an anchoring member through a smallest possible contact area (point contact), and also the polygon mirror is pressed at a radially innermost position of the mirror, in a radially inward direction. Accordingly, a pressing or fixing force applied to the polygon mirror is not transmitted to mirror surfaces thereof. Hence, distortion having an adverse effect on mirror surfaces does not occur, and optical performance improves.

What is claimed is:

1. A structure for mounting a polygon mirror on a rotatable body, said structure comprising:
a mirror seat formed on a periphery of said rotatable body for mounting the polygon mirror thereon; and
a planar ring-shaped anchoring member fixed to said rotatable body and having along a peripheral portion thereof a plurality of downwardly extending conical or semispherical projections operable to engage with an annular groove of a rectangular section to be formed in a top surface of the polygonal mirror at a position at a predetermined radius from a center of rotation of said rotatable body and to press against an upper edge of an inner periphery of the groove by point contact to thereby fix the polygon mirror in position on said rotatable body.

2. A mounting structure as claimed in claim 1, wherein said anchoring member has a plurality of radially extending pawls along a peripheral portion thereof, and said projections extend downwardly from said pawls.

3. A mounting structure as claimed in claim 2, wherein each said projection is formed integrally with a respective said pawl.

4. A mounting structure as claimed in claim 2, wherein each said projection is made of an elastic material and is fixed to a respective said pawl.

5. A mounting structure as claimed in claim 1, wherein said rotatable body includes a ceramic ring and a cylindrical sleeve shrink-fitted on said ceramic ring said cylindrical sleeve includes a small-diameter portion and a large-diameter portion along an outer periphery thereof, and said mirror seat is formed on a shoulder portion between said small-diameter portion and said large-diameter portion.

6. A mounting structure as claimed in claim 5, wherein a height of said cylindrical sleeve is substantially identical to that of said ceramic ring.

7. A mounting structure as claimed in claim 1, wherein said projections are dimensioned to enable them to make point contact with both the upper edge of the inner periphery and the upper edge of the outer periphery of the annular groove.

8. A mounting structure as claimed in claim 1, wherein said anchoring member is formed of an elastic material.

9. A mounting structure as claimed in claim 1, wherein said anchoring member comprises a first planar ring having along a peripheral portion thereof a plurality of pawls, each provided with a respective said projection, and a second planar ring formed of an elastic material and placed on top of said first planar ring.

10. An assembly comprising:
a rotatable body having on a periphery thereof a mirror seat;
a polygon mirror mounted on said mirror seat, said polygon mirror having a top surface having formed therein an annular groove of rectangular section at a position at a predetermined radius from a center of rotation of said rotatable body;
a planar ring-shaped anchoring member fixed to said rotatable body and having along a peripheral portion thereof a plurality of downwardly extending conical or semispherical projections; and
said projections of said anchoring member engaging with said annular groove in said polygon mirror and pressing against an upper edge of an inner periphery of said groove by point contact to thereby fix said polygon mirror in position on said rotatable body.

11. An assembly as claimed in claim 10, wherein said anchoring member has a plurality of radially extending pawls along a peripheral portion thereof, and said projections extend downwardly from said pawls.

12. An assembly as claimed in claim 11, wherein each said projection is formed integrally with a respective said pawl.

13. An assembly as claimed in claim 11, wherein each said projection is made of an elastic material and is fixed to a respective said pawl.

14. An assembly as claimed in claim 10, wherein said rotatable body includes a ceramic ring and a cylindrical sleeve shrink-fitted on said ceramic ring, said cylindrical sleeve includes a small-diameter portion and a large-diameter portion along an outer periphery thereof, and said mirror seat is formed on a shoulder portion between said small-diameter portion and said large-diameter portion.

15. An assembly as claimed in claim 14, wherein a height of said cylindrical sleeve is substantially identical to that of said ceramic ring.

16. An assembly as claimed in claim 10, wherein said projections are dimensioned to enable them to make point contact with both said upper edge of said inner periphery and an upper edge of an outer periphery of the annular groove.

17. An assembly as claimed in claim 10, wherein an adhesive material is applied to the inside of said annular groove for correcting the balance of said rotatable body.

18. An assembly as claimed in claim 10, wherein said anchoring member is formed of an elastic material.

19. An assembly as claimed in claim 10, wherein said anchoring member comprises a first planar ring having along a peripheral portion thereof a plurality of pawls, each provided with a respective said projection, and a second planar ring formed of an elastic material and placed on top of said first planar ring.

* * * * *